United States Patent [19] BEST AVAILABLE COPY [11] 3,895,237

Harr [45] July 15, 1975

[54] PEAK DETECTOR

[75] Inventor: Jerome Danforth Harr, San Jose, Calif.

[73] Assignee: International Business Machines Corporation, Armonk, N.Y.

[22] Filed: July 5, 1973

[21] Appl. No.: 376,368

[52] U.S. Cl. .......... 307/235 A; 328/150
[51] Int. Cl. .......... H03k 5/20
[58] Field of Search .......... 307/235 R, 235 A; 328/150

[56] References Cited

UNITED STATES PATENTS

| | | | |
|---|---|---|---|
| 3,626,214 | 12/1971 | Wesner | 307/235 R |
| 3,683,284 | 8/1972 | Mueller | 328/150 X |
| 3,725,795 | 4/1973 | Mesenhimer | 307/235 R |

*Primary Examiner*—John Zazworsky
*Attorney, Agent, or Firm*—Fraser and Bogucki

[57] ABSTRACT

A peak detector generates a signal representing the occurrence of a peak in an input signal waveform each time the slope of the input signal waveform reverses and travels through a dead zone defined by the difference between two different reference voltages. The dead zone which prevents short term reversals in the input signal waveform due to noise and other aberrations from generating signals representing valid peaks and which is defined by the difference between the two reference voltages is easily adjusted such as by varying the value of a single resistor in one embodiment to adapt the peak detector circuit to different input signal waveform situations. A common terminal which is coupled to the two different reference voltages through opposite voltage-responsive devices has a voltage which varies directly in response to the input signal waveform as applied thereto by a voltage coupling device such as a capacitor. The voltage-responsive devices maintain the voltage of the common junction within the range defined by the two different reference voltages by conducting whenever the common junction voltage equals either of the reference voltages. Alternate conductions of the voltage-responsive devices are used to trigger a bistable device which provides an accurate representation of the peaks of the input signal waveform.

16 Claims, 17 Drawing Figures

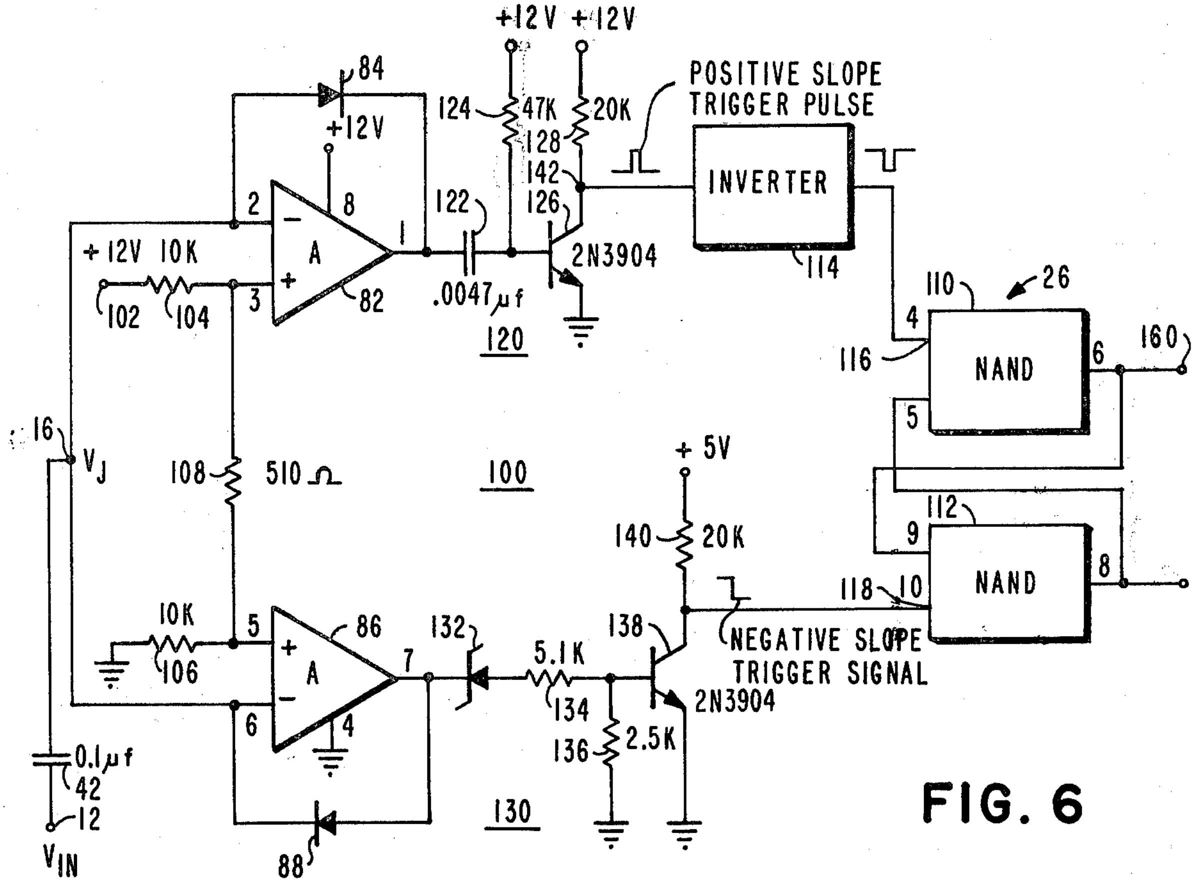
FIG. 6
INPUT SIGNAL $V_{IN}$
FIG. 7A
POSITIVE SLOPE TRIGGER PULSES
FIG. 7B
NEGATIVE SLOPE TRIGGER SIGNAL
FIG. 7C
SIGNAL AT OUTPUT TERMINAL 160
FIG. 7D
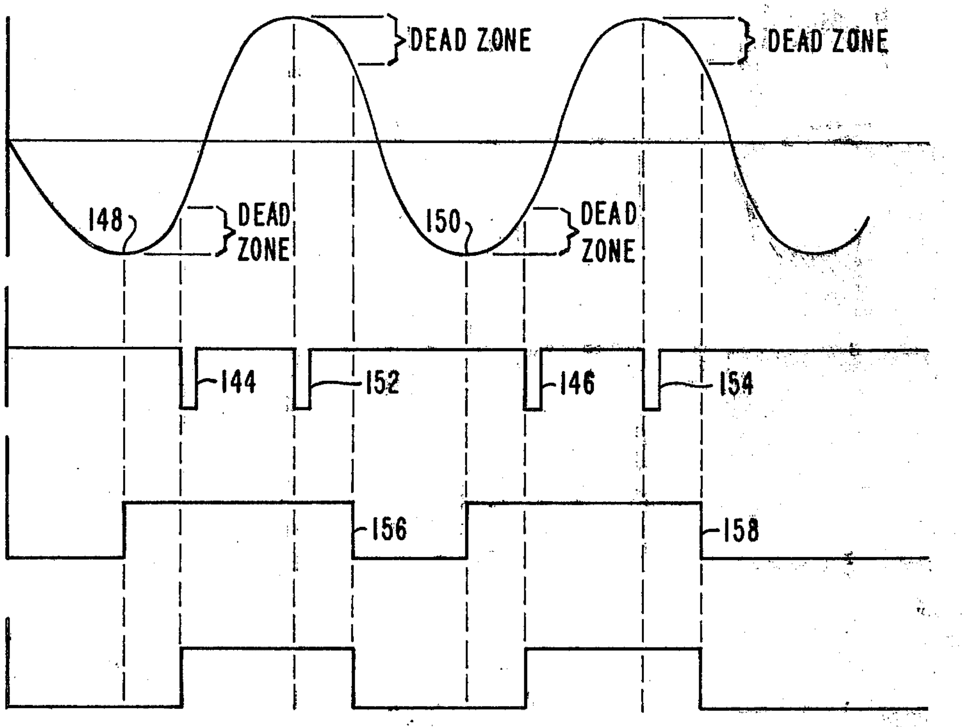

PEAK DETECTOR

BACKGROUND OF THE INVENTION

1. Field of the Invention

The present invention relates to circuits for generating signals representing one or more characteristics of a signal waveform, and more particularly to peak detectors of the type typically used in data detection arrangements and in which a signal indication is generated in response to each peak of an input signal of varying waveform.

2. History of the Prior Art

Peak detectors presently used in data detection operations and in similar operations generate a signal in response to each peak of an input signal waveform. Identification of the waveform peaks of an input signal in this fashion may be necessary to provide timing information or may represent actual information or data in instances where the incoming signal is a data signal with the peaks thereof representing the data.

Presently known peak detectors of the type described above typically suffer from a number of limitations. In an effort to provide some basis for distinguishing between valid or data-representing peaks and those which are the result of noise, many peak detectors operate about thresholds. Thresholds of the absolute type such as where a single voltage of fixed value defines the threshold are frequently considered disadvantageous and may be considered undesirable for certain applications, because of the tendency of most such fixed threshold values to drift or otherwise change due to temperature variations and similar factors. A further problem lies in the fact that many prior art peak detectors attempt to prevent false sensing of noise produced peaks by use of dead zones or similar signal buffer zones which are difficult to define in terms of circuit operation. For example it would be desirable to provide a peak detector in which a clearly defined dead zone must be traversed following the occurrence of each peak before a signal identifying such peak is generated.

In many prior art peak detectors a signal is generated in response to each and every peak of the incoming waveform, leaving the problem of subsequent processing of such signals in an effort to eliminate those which correspond to noise produced peaks from those which have resulted from valid data peaks. Further problems arise in connection with prior art peak detectors due to the inability of many such detectors to handle a wide range of input frequencies and input signal amplitudes and variations.

BRIEF DESCRIPTION OF THE INVENTION

The present invention provides a peak detector which is of relatively low cost and simple construction and yet which is capable of handling a wide range of input signal frequencies and amplitudes. The need for absolute threshold values is eliminated by peak detectors in accordance with the invention which utilize the difference between two reference voltages in defining a dead zone for purposes of noise immunity. Unlike some prior art detectors in which signals corresponding to all peaks are first generated with a later attempt being made to separate such signals in terms of validity, peak detectors in accordance with the invention utilize the dead zone upon the occurrence of each peak. Only when the dead zone is traversed does the detector generate a peak signal, thereby insuring that peaks due to noise and other signal aberrations and variations are eliminated.

In peak detectors according to the invention the input signal waveform is applied by a voltage coupling device such as a capacitor to make direct changes in the voltage of a common junction terminal. The junction terminal is coupled to two different reference voltages through voltage-responsive devices which maintain the voltage at the junction terminal within the range defined by the two different reference voltages by providing conduction through the capacitor whenever the voltage of the junction terminal equals either of the two reference voltages. The two reference voltages define a dead zone through which the junction terminal voltage must travel after the occurrence of each peak in the input signal waveform before current is allowed to flow in one of the voltage-responsive devices. Commencement of current flow in each of the voltage-responsive devices may be used to trigger a change in the state of a bistable circuit such as a latch in order to provide an accurate representation of the peaks of the incoming signal waveform.

In a simplified embodiment of a peak detector in accordance with the invention the voltage-responsive devices comprise diodes which are held in non-conduction when the junction terminal voltage is within the dead zone defined by the two different reference voltages and which conduct as necessary so as to maintain the voltage at the junction terminal within the range of possible values defined by the two different reference voltages.

In a different embodiment of a peak detector according to the invention, each of the voltage-responsive devices comprises an operational amplifier having a first input coupled to receive one of the reference voltages, a second input coupled to the junction terminal and a unilateral current conducting device coupled between the second input and an output of the amplifier. The output of the operational amplifier is at a first voltage level when the voltage of the junction terminal is within the range between the two different reference voltages, but changes to a second value with simultaneous conduction of the unilateral current conducting device when the junction terminal voltage becomes equal to the reference voltage. This change in the output of the operational amplifier is applied to change the state of bistable circuitry in appropriate fashion such as by use of circuitry which generates triggering pulses or circuitry which generates a change in signal level. The unilateral current conducting device may comprise a diode, or alternatively an arrangement of transistors.

BRIEF DESCRIPTION OF THE DRAWINGS

The foregoing and other objects, features and advantages of the invention will be apparent from the following more particular description of preferred embodiments of the invention, as illustrated in the accompanying drawing, in which:

FIG. 6 is a schematic diagram of a still further arrangement of a peak detector in accordance with the invention;

FIGS. 7A, 7B, 7C and 7D are waveforms useful in explaining the operation of the arrangement of FIG. 6; and, FIG. 8 is a schematic diagram of a still further arrangement of a peak detector in accordance with the invention.

DETAILED DESCRIPTION

Figure 1:
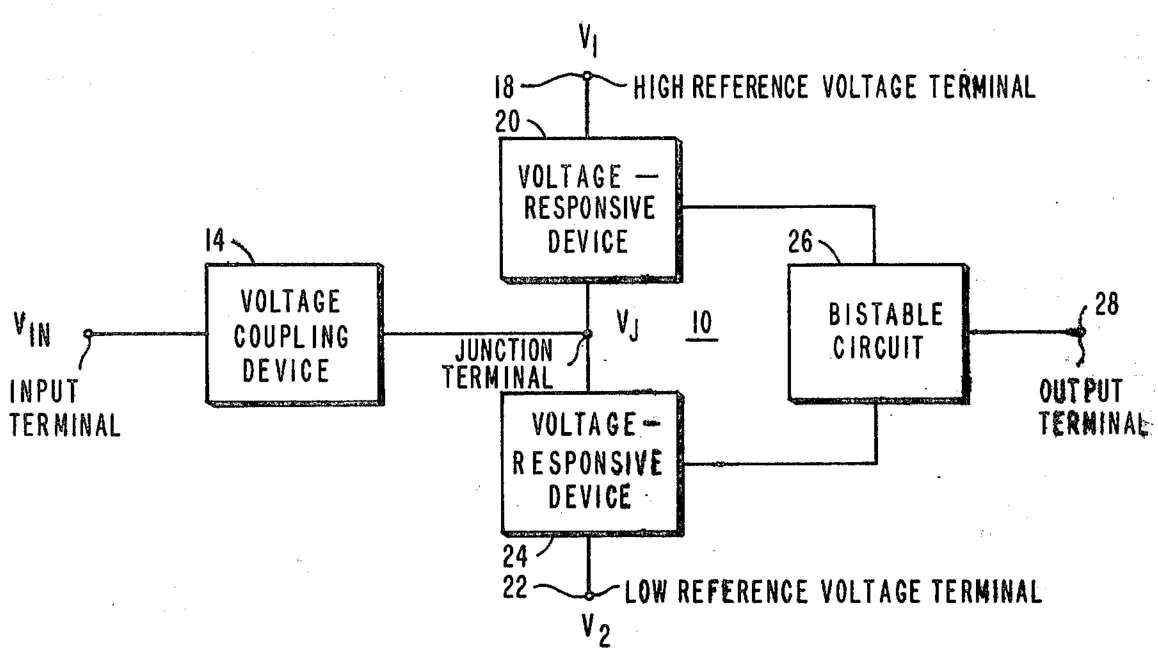
FIG. 1 is a block diagram of a peak detector in accordance with the invention.

FIG. 1 depicts a peak detector 10 in accordance with the invention. The detector 10 includes an input terminal 12 for receiving an input signal waveform $V_{IN}$, the peaks of which are to be detected. A voltage coupling device 14 couples the input terminal 12 to a junction terminal 16 in a manner so that the voltage $V_J$ at the junction terminal 16 is varied in direct relation with $V_{IN}$. The junction terminal 16 is coupled to a high reference voltage terminal 18 through a first voltage-responsive device 20 and to a low reference voltage terminal 22 through a second voltage-responsive device 24. The voltage-responsive device 20 insures that $V_J$ does not exceed a first reference voltage $V_1$ at the terminal 18. Similarly the voltage-responsive device 24 insures that $V_J$ does not drop lower than a second reference voltage $V_2$ at the terminal 22. In this manner $V_J$ is maintained within the dead zone or range defined by $V_1$ and $V_2$. Whenever $V_J$ becomes substantially equal to $V_1$, the voltage-responsive device 20 provides a signal to set or change the state of a bistable circuit 26. Conversely the voltage-responsive device 24 resets or changes the state of the bistable circuit 26 whenever the junction voltage $V_J$ becomes equal to $V_2$.

As will be seen from the discussion to follow the junction voltage $V_J$ follows the input voltage $V_{IN}$ so as to increase and decrease with corresponding increases and decreases in $V_{IN}$. At the same time $V_J$ is maintained within the range defined by $V_1$ and $V_2$. Upon reversal in the slope of $V_{IN}$ the traversal of $V_J$ between $V_1$ and $V_2$ defines a dead zone, in the sense that only after this voltage range is traversed is a signal denoting the peak generated by one of the devices 20, 24. Reversals in the slope of $V_{IN}$ due to noise and other spurious signals are typically of much smaller amplitude than are the reversals in slope due to valid data which $V_{IN}$ may be carrying. Since the bistable circuit 26 is switched in response to a reversal in the slope of $V_{IN}$ only after the dead zone defined by $V_1$ and $V_2$ is passed through by $V_J$, the effects of the unwanted noise are excluded from the signal at an output terminal 28 representing the behavior of the bistable circuit 26.

Figures 2, 4:
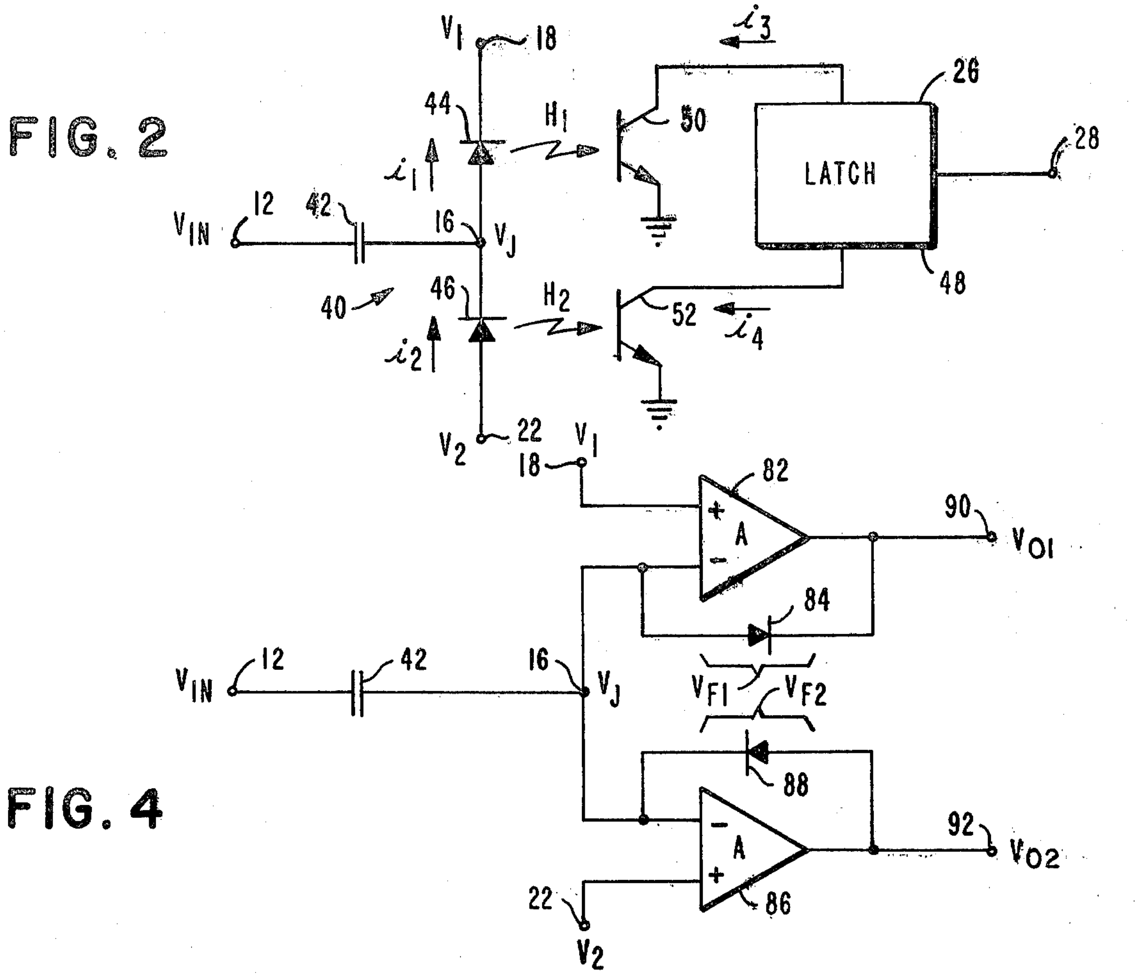
FIG. 2 is a schematic diagram of one preferred arangement of a peak detector in accordance with the invention.
FIG. 4 is a sehcmatic diagram of an alternative arrangement of a peak detector in accordance with the invention.

One preferred arrangement of a peak detector in accordance with the invention is shown in FIG. 2. FIG. 2 illustrates a peak detector 40 in which the input terminal 12 is coupled to the junction terminal 16 through the voltage coupling device 14 in the form of a capacitor 42. The voltage-responsive device 20 comprises a light emitting diode 44 coupled between the junction terminal 16 and the high reference voltage terminal 18. The voltage-responsive device 24 comprises a light emitting diode 46 coupled between the junction terminal 16 and the low reference voltage terminal 22. The diode 44 is poled to conduct current in a direction from the junction terminal 16 to the high reference voltage terminal 18, with the current through the diode 44 being designated $i_1$. The diode 46 is poled to conduct current in a direction from the low reference voltage terminal 22 to the junction terminal 16, the current through the diode 46 being designated $i_2$. The bistable circuit 26 is in this instance shown as comprising a latch 48 having a first input coupled to the collector of a phototransistor 50 and a second input coupled to the collector of a phototransistor 52. Flow of the current $i_1$ through the diode 44 causes the diode 44 to produce light H, which turns on the transistor 50 to conduct a current $i_3$ and set the latch 48. Conversely flow of the current $i_2$ causes the diode 46 to produce light $H_2$ which causes conduction of current $i_4$ through the transistor 52 to reset the latch 48. In actual practice the diode phototransistor combinations 44, 50 and 46, 52 may comprise appropriate circuits such as the circuits sold under the designation TIL111 by Texas Instruments Company. In the arrangement of FIG. 2 $V_{IN}$ is assumed to be substantially larger than the forward voltage drops across the diodes 44 and 46 so that the diodes 44 and 46 may be considered as though ideal.

Figures 3A, 3B, 3C, 3D, 3E:
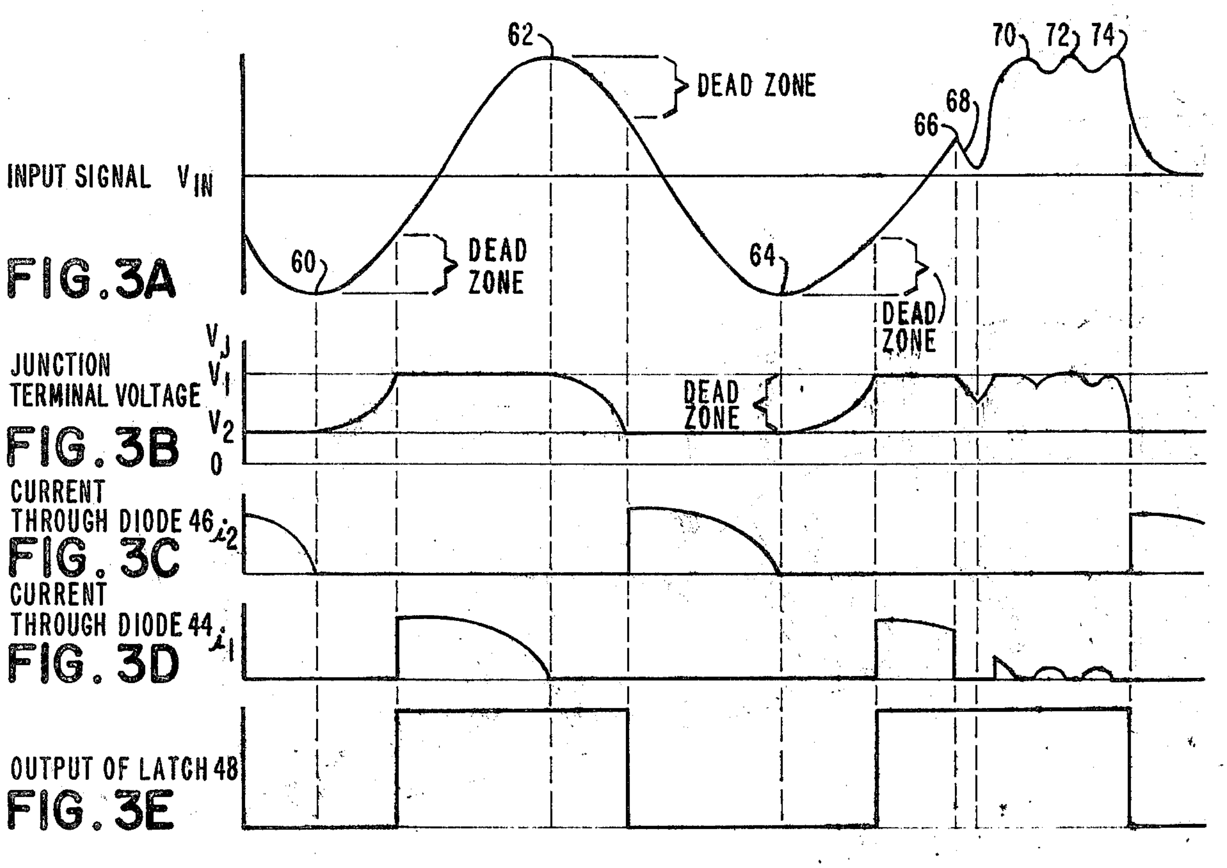
FIGS. 3A, 3B, 3C, 3D and 3E are waveforms useful in explaining the operation of the arrangement of FIG. 2.

Operation of the peak detector 40 of FIG. 2 may be understood with reference to FIGS. 3A–3E. FIG. 3A illustrates the waveform of a typical input signal $V_{IN}$ which is generally sinusoidal through a negative peak 60, then a positive peak 62, then a negative peak 64. After the occurrence of the negative peak 64 the waveform of $V_{IN}$ increases through zero to a point 66 at which a noise spike 68 occurs. Thereafter the waveform rapidly increases, but to a series of small peaks 70, 72 and 74 rather than to a single peak, the series of small peaks being the effect of noise and tending to mask the desired single peak which would otherwise occur.

The junction terminal voltage $V_J$ is illustrated in FIG. 3B. The currents $i_2$ and $i_1$ are respectively illustrated in FIGS. 3C and 3D, while the output of the latch 48 is illustrated in FIG. 3E.

As the input voltage $V_{IN}$ decreases to the negative peak 60 the junction terminal voltage $V_J$ remains equal to $V_2$ and does not decrease due to the flow of current $i_2$ through the diode 46. As the negative peak 60 is reached, $V_{IN}$ experiences a slope reversal and begins to increase. At this point both of the diodes 44 and 46 are reversed biased and cannot conduct so as to supply current to the capacitor 42. As a result $V_J$ increases in direct relation to $V_{IN}$ until the value $V_1$ is reached as seen in FIG. 3B. When $V_J$ becomes substantially equal to $V_1$, the diode 44 conducts to prevent $V_J$ from becoming any more positive. The flow of current $i_1$ through the diode 44 is illustrated in FIG. 3D. Both $i_1$ and $i_2$ are proportional to the slope of $V_{IN}$. As the waveform of $V_{IN}$ approaches the upper peak 62 and experiences a slope reversal both of the diodes 44 and 46 again become reversed biased allowing the junction terminal voltage $V_J$ to decrease in direct relation with $V_{IN}$. When $V_J$ decreases to the point where it is substantially equal to $V_2$ the diode 46 conducts to prevent $V_J$ from going any more negative.

As the waveform of $V_{IN}$ increases from the negative peak 64, the junction terminal voltage $V_J$ again increases to $V_1$ where it remains until the point 66 is encountered. The resulting spike 68 causes a momentary decrease in $V_J$ as seen in FIG. 3B. Thereafter the waveform of $V_{IN}$ increases until the small peaks 70, 72 and 74 are encountered, producing small dips in $V_J$ as seen in FIG. 3B. Because the changes in voltage produced by the spike 68 and the peaks 70, 72 and 74 are all smaller than the dead zone defined by the difference between $V_1$ and $V_2$, there is no flow of the current $i_2$ through the diode 46. Since the latch 48 changes state only in response to generation of the other current when one of the currents has produced that state, and vice versa, the relatively small signals 68, 70, 72, and 74 do not affect the latch 48, the output of which is seen in FIG. 3E.

Upon termination of the small peak 74 in $V_{IN}$, the waveform of $V_{IN}$ reverses slope and decreases as seen in FIG. 3A. Since the change in slope is large enough, the dead zone is exceeded and $V_J$ is driven to $V_2$, at which point the diode 46 conducts current $i_2$ and the state of the latch 48 is changed.

It will be seen that peak detectors in accordance with the invention effectively use two different reference voltages, $V_1$ and $V_2$, to define a dead zone. Upon each reversal in the slope of the input signal waveform the dead zone must be traversed before a signal is generated indicating the occurrence of a peak. By utilizing the effect of the dead zone upon the occurrence of each peak the problem present in many prior art circuits of generating peak representative signals and thereafter determining which are valid signals is obviated. Peak detectors according to the invention are capable of functioning over a wide range of frequencies and amplitudes of the input signal $V_{IN}$. Where the amplitude of the input signal $V_{IN}$ varies, or where the severity of the noise spikes changes, the dead zone $V_1 - V_2$ is very easily adjusted to accommodate such changes as discussed in connection with one of the later embodiments.

Figures 5A, 5B, 5C:
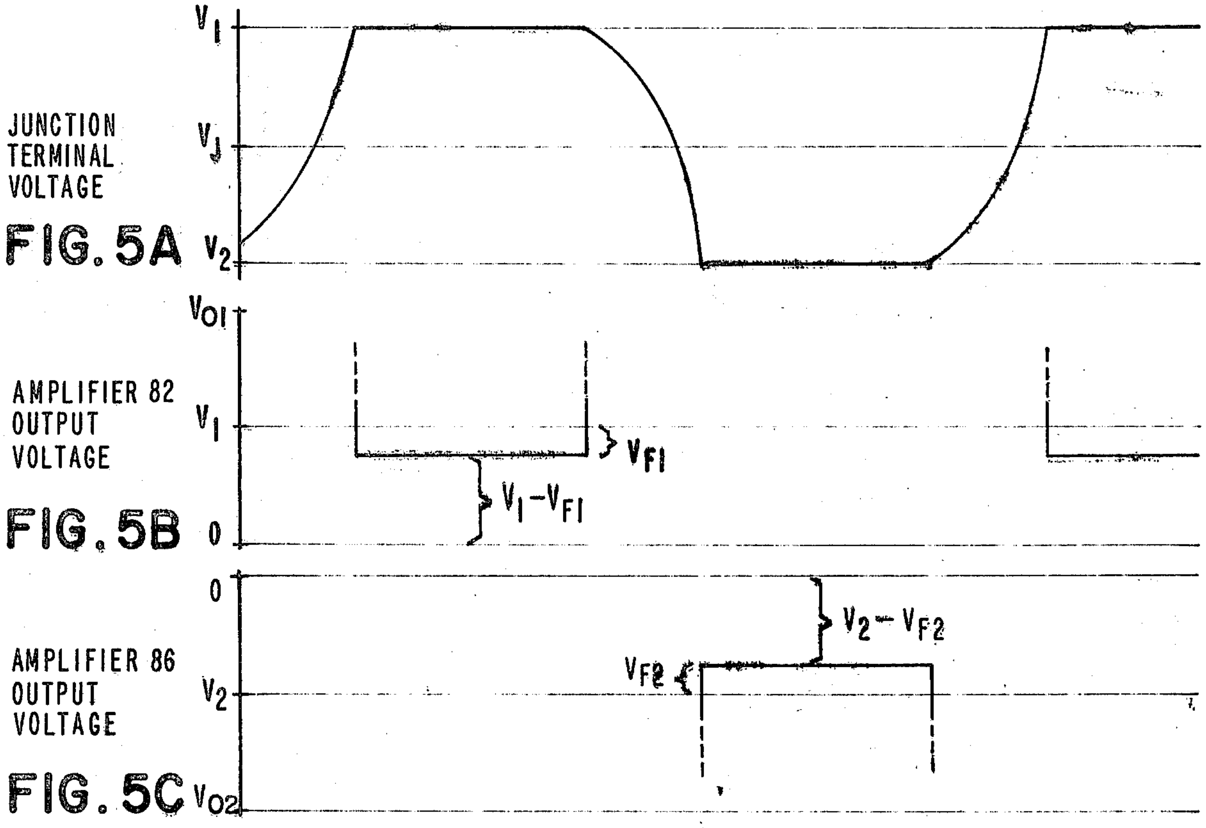
FIGS. 5A, 5B and 5C are waveforms useful in illustrating the operation of the arrangement of FIG. 4.

An alternative arrangement of a peak detector in accordance with the invention is illustrated in FIG. 4, with corresponding waveforms being illustrated in FIGS. 5A–5C. The peak detector 80 of FIG. 4 is similar to the peak detector 40 of FIG. 2 in that the input terminal 12 thereof is coupled via the capacitor 42 to the junction terminal 16. However the peak detector 80 differs from the detector 40 in that instead of comprising diodes the voltage-responsive devices comprise operational amplifiers with diodes coupled in a feedback configuration. The high reference voltage terminal 18 is coupled to the junction terminal 16 via an operational amplifier 82 which includes a diode 84 coupled between the output terminal of the amplifier 82 and a second input terminal of the amplifier 82, the first input terminal of the amplifier being coupled to the high reference voltage terminal 18. The second input terminal is also coupled to the junction terminal 16. The diode 84 is poled to conduct current in a direction from the second input terminal to the output terminal of the amplifier 82. The junction terminal 16 is coupled to the low reference voltage terminal 22 via an operational amplifier 86 and included diode 88. The amplifier 86 has a first input terminal coupled to the low reference voltage terminal 22 and a second input terminal coupled to the junction terminal 16. The diode 88 is coupled between the second input terminal and an output terminal of the amplifier 86, and is poled to conduct current in a direction from the output terminal to the second input terminal.

The operational amplifiers 82 and 86 and their associated diodes 84 and 88 operate in much the same fashion as do the diodes 44 and 46 of the peak detector 40 of FIG. 2. When $V_J$ is less than $V_1$ the amplifier 82 has a very high output voltage at an output terminal 90 because of the high gain of the amplifier, and there is no conduction through the diode 84. When the junction terminal voltage $V_J$ becomes substantially equal to the high reference voltage $V_1$ the output voltage $V_{01}$ falls to a point where the diode 84 conducts enough current to keep $V_J$ from going any higher. To do this $V_{01}$ must fall to a voltage $V_1 - V_{F1}$ is the forward voltage drop across the diode 84. This is illustrated in FIG. 5B. When $V_J$ begins to decrease below the high reference voltage $V_1$ due to a reversal in the slope of the input signal $V_{IN}$, conduction through the diode 84 terminates and the output signal $V_{01}$ again rises to its high value.

When $V_J$ is higher than the low reference voltage $V_2$, the output voltage $V_{02}$ at a terminal 92 is very high in the negative direction with respect to $V_J$. However when $V_J$ falls to a value substantially equal to $V_2$ due to the occurrence of a peak in the input signal $V_{IN}$, the output voltage $V_{02}$ rises in a positive direction to initiate conduction through the diode 88. The output voltage $V_{02}$ settles at a value $V_2 - V_{F2}$ where $V_{F2}$ is the forward voltage drop across the diode 88, as seen in FIG. 5C. When $V_J$ begins to increase above $V_2$ due to the occurrence of a negative peak in the input signal $V_{IN}$, the diode 88 stops conducting and the output voltage $V_{02}$ of the differential amplifier 86 becomes very large in the negative direction as shown in FIG. 5C.

As seen in FIGS. 5B and 5C the rapid decreases in the amplifier outputs $V_{01}$ and $V_{02}$ occur after a peak in the input signal $V_{IN}$ has occurred and $V_J$ has traversed the dead zone. Accordingly these transitions in the amplifier outputs may be used to generate peak signals as described in connection with FIG. 6.

FIG. 6 illustrates a peak detector 100 which utilizes operational amplifiers with feedback diodes as the voltage-responsive devices as in the case of FIG. 4. In the detector 100 of FIG. 6 the input terminal 12 is coupled through the capacitor 42 to the junction terminal 16. The junction terminal 16 is coupled to the second input terminals of the operational amplifiers 82 and 86, and diodes 84 and 88 are coupled between the second input terminals and the output terminals, in the fashion of the peak detector 80 of FIG. 4. In the present example the operational amplifiers 82 and 86 comprise integrated circuits sold under the designation SN52558 by Texas Instruments Company.

The reference voltages $V_1$ and $V_2$ are provided by an arrangement which includes a positive voltage terminal 102, a pair of like resistors 104 and 106, and a resistor 108. The terminal 102 is coupled to the first input terminal of the operational amplifier 82 through the resistor 104. Similarly a ground connection is coupled to the first input terminal of the operational amplifier 86 through the resistor 106. The resistor 108 which determines the size of the dead zone is coupled between the first input terminals of the amplifiers 82 and 86. The resistor 108 can be variable or can be replaced with resistors of other value to change the size of the dead zone as required. It will be appreciated that the peak detector 100 of FIG. 6 is highly advantageous in its provision for changing the dead zone by a simple adjustment or change of the resistor 108.

In the arrangement of FIG. 6 the bistable circuit 26 comprises a latch in the form of a pair of cross-coupled NAND circuits 110 and 112. The NAND circuits 110 and 112 as well as an inverter 114 coupled to one of the inputs of the NAND circuit 110 comprise integrated circuits sold under the designation SN7400 by Texas Instruments Company. The NAND circuit 110 has an input terminal 116 corresponding to one of the inputs of the bistable circuit 26 shown in FIG. 1. The other input of the bistable circuit 26 in FIG. 1 corresponds to an input terminal 118 at the NAND circuit 112 of FIG. 6.

The output of the operational amplifier 82 is coupled to the bistable input terminal 116 by a trigger pulse generating circuit 120 which includes a capacitor 122, a resistor 124, a transistor 126, a resistor 128, and the inverter 114. The output of the operational amplifier 86 is coupled to the other bistable input 118 by a trigger signal generating circuit 130 which includes a Zener diode 132, a resistor 134, a resistor 136, a transistor 138 and a resistor 140.

As discussed in connection with the peak detector 80 of FIG. 4 and the corresponding waveforms of FIGS. 5A–5C, the outputs of the differential amplifiers 82 and 86 decrease rapidly in response to reversals in the slope of the input signal $V_{IN}$. The trigger pulse generating circuit 120 of FIG. 6 responds to each such decrease in the output of the amplifier 82 to generate a trigger pulse and apply it to the bistable input 116. In this instance the trigger pulses are denoted positive slope trigger pulses since they are generated whenever a negative-going input signal $V_{IN}$ reverses slope to become positive-going. The trigger pulse generating circuit 120 essentially comprises a single shot or monostable multivibrator in which the transistor 126 normally conducts to hold a terminal 142 at the collector thereof at a low voltage. When the output of the amplifier 82 drops, the transistor 126 is cut off for a short period of time, allowing the voltage at the terminal 142 to rise and providing a positive slope trigger pulse as shown in FIG. 6. The trigger pulse is inverted by the inverter 114 since the terminal 116 of the NAND circuit 110 responds to a negative-going signal transistion.

The pulse output of the trigger pulse generating circuit 120 of FIG. 6 is shown in FIG. 7B for an input signal $V_{IN}$ shown in FIG. 7A. As described in connection with the peak detector 80 of FIG. 4, the output of the operational amplifier 82 decreases after the input signal $V_{IN}$ has gone through a negative peak and the junction voltage $V_J$ has traversed the dead zone. Accordingly trigger pulses 144 and 146 are generated in response to the negative peaks 148 and 150 respectively as shown in FIGS. 7A and 7B. As a practical matter, however, additional trigger pulses are typically generated in the region of the positive peaks of the input signal $V_{IN}$, with two such pulses 152 and 154 being shown in FIG. 7B. If the actual waveform of $V_{IN}$ fluctuates slightly in the region of a positive peak so as to become momentarily negative-going and then positive-going, the output of the amplifier 82 decreases since $V_J$ is substantially equal to the high reference voltage $V_1$. This results in generation of trigger pulses such as the pulses 152 and 154 of FIG. 7B. As will be seen from the discussion to follow the effects of pulses such as the pulses 152 and 154 of FIG. 7B are eliminated by the arrangement of FIG. 6.

The trigger signal generating circuit 130 of FIG. 6 functions as a DC level sensing circuit to provide a negative slope trigger signal shown in FIG. 7C to the bistable input terminal 118. The negative slope trigger signal which is bistatic in nature assumes the upper of its two values when the output of the operational amplifier 86 decreases to its low value. The negative slope trigger signal remains at the higher of the two levels until the output of the operational amplifier 86 rises. Since the bistable inputs 116 and 118 respond to negative-going signal transistions, the edges 156 and 158 of the negative slope trigger signal are operative to change the state of the latch comprised of the NAND circuits 110 and 112. The signal at an output terminal 160 of the NAND circuit 110 is illustrated in FIG. 7D. As seen in FIG. 7D the latch 26 changes state in response to the negative-going portion of the trigger pulse 144 to denote the negative peak 148. The latch 26 remains in this state upon the occurrence of the trigger pulse 152, thereby rendering the pulse 152 of no effect. Upon the occurrence of the negative-going edge 156 of the negative slope trigger signal the latch 26 changes state to denote the positive peak in the input signal $V_{IN}$. In similar fashion the latch 26 again changes state in response to the trigger pulse 146 to denote the negative peak 150 of $V_{IN}$ and again changes state in response to the negative-going edge 158 of the negative slope trigger signal to denote the positive peak in $V_{IN}$.

As previously mentioned a single resistor 108 determines the dead zone in the arrangement of FIG. 6. In one such circuit constructed and successfully tested in accordance with the invention a resistor 108 of 510 ohms value provided a dead zone range $V_{DZ}$ of 300 millivolts and a $V_{DZ}/V_{IN}$ ratio of 15%, where the amplitude of $V_{IN}$ was 2 volts. Reduction of the value of the resistor 108 to 330 ohms produced a $V_{DZ}$ of 200 millivolts and a ratio $V_{DZ}/V_{IN}$ of 10%. Conversely an increase in the value of the resistor 108 to 680 ohms produced a $V_{DZ}$ of 400 millivolts and a ratio $V_{DZ}/V_{IN}$ of 20%. Accordingly it will again be appreciated that the change in value of a single resistor provides for a change in the dead zone. Such change, moreover, is substantially independent of the frequency of the input signal $V_{IN}$ as is the remainder of the peak detector circuit. The size of the dead zone may be readily increased or decreased dependent upon operating factors including the amplitude of the input signal $V_{IN}$ and the relative sizes of noise spikes and other spurious signals relative to the peak amplitudes of $V_{IN}$.

In the peak detectors 80 and 100 of FIGS. 4 and 6 the diodes 84 and 88 are used to shunt the operational amplifiers and produce the output signals whenever $V_J$ becomes equal to either of the reference voltages $V_1$ and $V_2$. In the particular arrangement of FIG. 8 this function is performed by arrangements of transistors. A differential amplifier 170 corresponds to the operational amplifier 86 of FIGS. 4 and 6, while a differential amplifier 172 corresponds to the operational amplifier 82 of FIGS. 4 and 6. A reference voltage of 4.05 volts is applied to the positive input terminal of the amplifier 170, while a reference voltage of 4.45 volts is applied to the positive input terminal of the amplifier 172. The outputs of the amplifiers 170 and 172 are coupled to a latch 174 which is in turn coupled to an output driver 176 having a terminal 178 at which the output signal of the peak detector appears. The NPN transistors of the FIG. 8 arrangement are of the 2N3904 type, while the PNP transistors are of the 2N3906 type.

Figure 8:
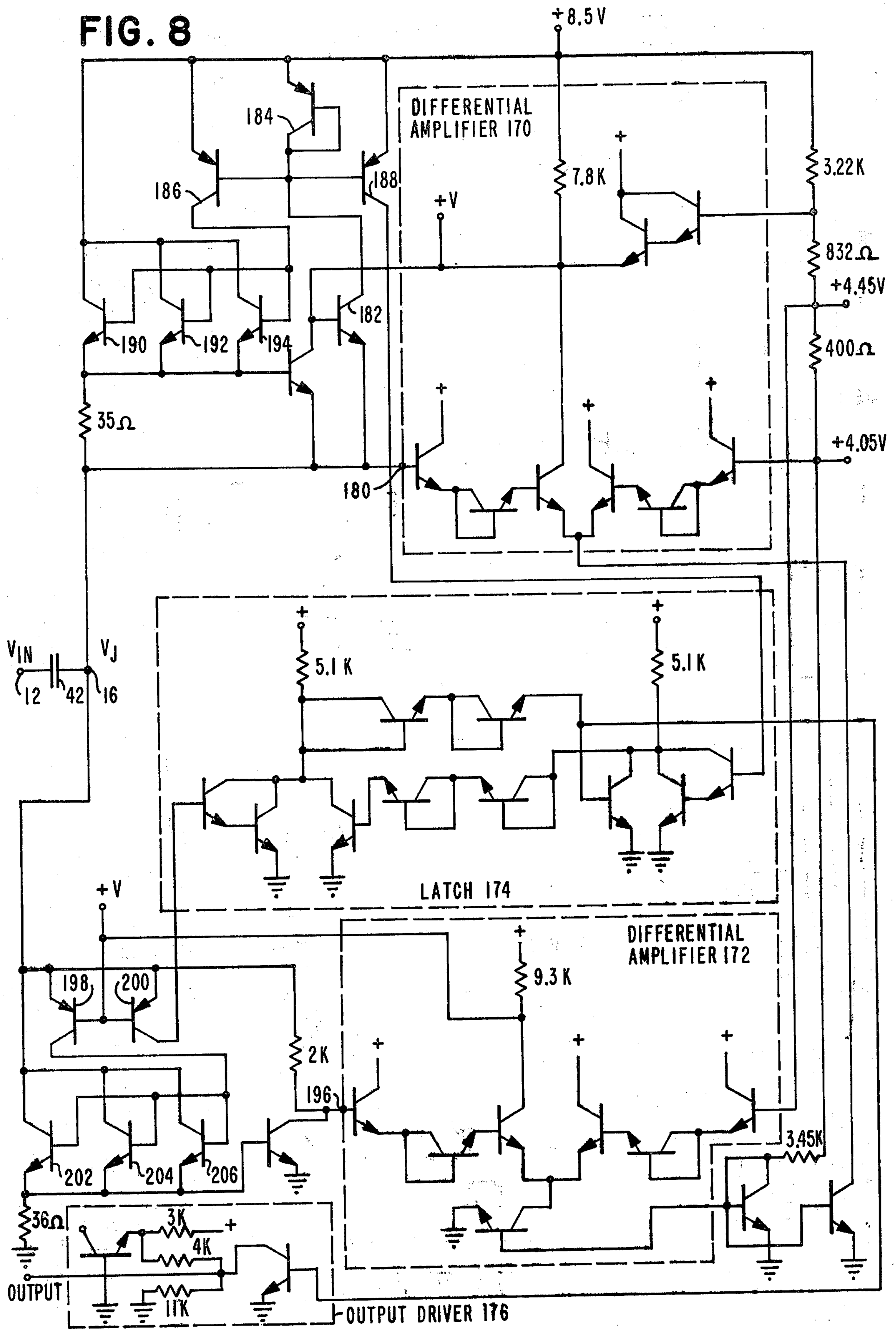

As previously noted the amplifiers 170 and 172 of the FIG. 8 arrangement are operated in conjunction with arrangements of transistors rather than diodes. Otherwise the operation of the FIG. 8 arrangement is similar to the arrangements previously described. The differential amplifier 170 has a negative input terminal 180 which is coupled directly to the junction terminal 16. When $V_J$ is less than 4.05 volts the differential amplifier 170 causes a transistor 182 to conduct. This causes conduction of a transistor 184. The current flow through the transistor 184 biases an associated pair of transistors 186 and 188 to conduct substantially the same value of current as is conducted by the transistor 182. The current flowing through the transistor 186 is applied to the bases of three different transistors 190, 192 and 194, biasing the transistors 190, 192 and 194 into conduction. Conduction of the transistors 190, 192 and 194 clamps the input terminal 180 at 4.05 volts. The current through the transistor 188 is applied to the latch 174 to change the state thereof. The circuit continues to operate in this fashion with the transistors 190, 192 and 194 clamping the input terminal 180 at 4.05 volts until $V_J$ becomes greater than 4.05 volts. At that point the transistor 182 stops conducting, and the other transistors 184, 186, 188, 190, 192 and 194 are also rendered nonconductive.

The differential amplifier 172 has its negative input terminal coupled to the junction terminal 16 through a slightly different arrangement of transistors. When $V_J$ is less than 4.45 volts a pair of matched transistors 198 and 200 are turned off. When $V_J$ reaches 4.45 volts and attempts to go higher the differential amplifier 172 biases the matched transistors 198 and 200 into conduction. Conduction of the transistor 198 biases three different transistors 202, 204 and 206 into conduction so as to clamp the voltage at the negative input terminal 196 at 4.45 volts. At the same time the transistor 200 which conducts an identical current to that of the transistor 198 changes the state of the latch 174. The circuit continues to operate in this fashion until $V_J$ falls below 4.45 volts, at which point the matched transistors 198 and 200 are biased into nonconduction to cut off the transistors 202, 204 and 206.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A circuit for detecting peaks of an input signal waveform comprising:

means defining two different signal levels;

common junction means having a signal thereat;

means coupled to the common junction means and responsive to the input waveform for varying the level of the signal at the junction means between the two different signal levels in direct relation with the input signal waveform, the level of the signal at the junction means being varied in response to each reversal in the slope of the input waveform;

first means coupled to the common junction means and responsive to one of the two different signal levels for generating a first peak signal when the level of the signal at the junction means is substantially equal to said one of the two different signal levels, said first means including means for conducting whenever the level of the signal at the junction means substantially equals said one of the two different levels to maintain the level of the signal at the junction means substantially equal to said one of the two different signal levels; and second means coupled to the common junction means and responsive to the other one of the two different signal levels for generating a second peak signal when the level of the signal at the junction means is substantially equal to said other one of the two different signal levels, said second means including means for conducting whenever the level of the signal at the junction means substantially equals said other one of the two different signal levels to maintain the level of the signal at the junction means substantially equal to said other one of the two different signal levels.

2. A circuit in accordance with claim 1, further including bistable means for assuming a first state in response to generation of the first peak signal and for assuming a second state in response to generation of the second peak signal.

3. A circuit for detecting peaks of an input voltage waveform comprising:

means defining first and second voltages of different value;

means responsive to the first and second voltages and including a terminal having a voltage thereat for maintaining the terminal voltage within the range defined by the first and second voltages;

means coupled to the terminal and responsive to the input voltage waveform for increasing the terminal voltage in response to increases in the input voltage waveform and for decreasing the terminal voltage in response to decreases in the input voltage waveform;

means responsive to the first and second voltages and the terminal voltage for generating a peak signal whenever the terminal voltage substantially equals either of the first and second voltages;

a bistable circuit; and an electrical network connecting the bistable circuit to the means for generating a peak signal, the electrical network being operative to generate a bilevel signal at the output of the bistable circuit which changes between a first level and a second level in response to generation of the peak signals.

4. A circuit in accordance with claim 3, wherein the means for maintaining the terminal voltage within the range defined by the first and second voltages comprises a first device coupled to the terminal and operative to conduct current whenever the terminal voltage equals the first voltage and a second device coupled to the terminal and operative to conduct current whenever the terminal voltage equals the second voltage.

5. A circuit in accordance with claim 4, wherein each of the first and second devices includes a unilateral conducting device coupled to be biased into conduction whenever the terminal voltage equals the first or the second voltage.

6. A circuit for detecting peaks of an input signal waveform comprising:

a first reference terminal having a fixed high reference voltage thereat;

a second reference terminal having a fixed low reference voltage thereat;

a common terminal;

a first diode coupled between the common terminal and the first reference terminal and poled to pass current in a direction from the common terminal to the first reference terminal;

a second diode coupled between the common terminal and the second reference terminal and poled to pass current in a direction from the second reference terminal to the common terminal;

an input terminal coupled to receive the input signal waveform;

a capacitor coupled between the input terminal and the common terminal; and a bistable circuit coupled to be set by current flow in the first diode and to be reset by current flow in the second diode.

7. A circuit in accordance with claim 6, wherein the first and second diodes are light emitting diodes, and further including first phototransistor means responsive to light emitted by the first diode for setting the bistable circuit and second phototransistor means responsive to light emitted by the second diode for resetting the bistable circuit.

8. A circuit for detecting peaks of an input signal waveform comprising:

a first reference terminal having a fixed first reference voltage thereat;

a second reference terminal having a fixed second reference voltage thereat;

a first operational amplifier having first and second input terminals and an output terminal, the first input terminal being coupled to the first reference terminal;

a second operational amplifier having first and second input terminals and an output terminal, the first input terminal being coupled to the second reference terminal;

a first unilateral current conducting device coupled between the second input terminal and the output terminal of the first operational amplifier;

a second unilateral current conducting device coupled between the second input terminal and the output terminal of the second operational amplifier; and capacitor means having one end coupled to the second input terminals of the first and second operational amplifiers and an opposite end coupled to receive the input signal waveform.

9. A circuit in accordance with claim 8, wherein each unilaterial current conducting device comprises a diode.

10. A circuit in accordance with claim 8, wherein each unilateral conducting device comprises at least one transistor.

11. A circuit in accordance with claim 10, wherein each unilateral conducting device comprises a first transistor coupled to be biased into conduction whenever the voltage at the second input terminal of the associated operational amplifier is substantially equal to the reference voltage at the first input terminal of the operational amplifier, a plurality of transistors coupled to clamp the second input terminal at a voltage substantially equal to the reference voltage at the first input terminal of the operational amplifier whenever the first transistor conducts, and a second transistor coupled to provide an output signal whenever the first transistor conducts.

12. A circuit in accordance with claim 8, further including a bistable circuit coupled to be set and reset by signals at the output terminals of the first and second operational amplifiers respectively.

13. A circuit in accordance with claim 12, further including at least one trigger pulse generating circuit coupled between the output terminal of one of the operational amplifiers and one of the input terminals of the bistable circuit, the trigger pulse generating circuit being operative to generate a pulse in response to a signal change of given sense at the output terminal of the operational amplifier.

14. A circuit in accordance with claim 12, further including at least one trigger signal generating circuit coupled between the output terminal of one of the operational amplifiers and one of the input terminals of the bistable circuit, the trigger signal generating circuit being operative to generate a bilevel signal which changes from a first level to a second level in response to a signal change of given sense at the output terminal of the operational amplifier.

15. A circuit in accordance with claim 8, further including a bistable circuit having an input circuit coupled to the output terminals of said first and second operational amplifiers and having at least one output terminal, said bistable circuit being operative to provide two different signal levels at said output terminal in response to signals at the output terminals of the first and second operational amplifiers respectively.

16. A circuit in accordance with claim 12, further including an electrical network connecting said bistable circuit to said output terminals of said first and second operational amplifiers, said electrical network being operative to generate a bilevel signal at the output of said bistable circuit which changes between a first level and a second level in response to signal changes of given sense at the output terminals of the operational amplifiers.

* * * * *